United States Patent [19]
Mark et al.

[11] 3,821,320
[45] June 28, 1974

[54] ARALKYLATION OF AROMATIC HYDROCARBONS

[75] Inventors: Victor Mark, Ransomville; Leon R. Zengierski, North Tonawanda, both of N.Y.

[73] Assignee: Hooker Chemical Corporation, Niagara Falls, N.Y.

[22] Filed: May 12, 1971

[21] Appl. No.: 142,813

Related U.S. Application Data
[63] Continuation-in-part of Ser. No. 123,014, March 10, 1971.

[52] U.S. Cl....... 260/649 R, 260/DIG. 24, 260/458, 260/649 D, 260/649 F
[51] Int. Cl............................................. C07c 25/18
[58] Field of Search....... 260/649 R, 649 DP, 649 F

[56] References Cited
UNITED STATES PATENTS
2,600,691  6/1952  Ross et al...................... 260/650 R FOREIGN PATENTS OR APPLICATIONS
1,193,510  5/1965  Germany....................... 260/649 R OTHER PUBLICATIONS
Ross et al. II, J. Am. Chem. Soc. 71, 2756–2758 1949.
Ross et al. III, Chem. Abs. 55, 11352f, 1961.

*Primary Examiner*—Howard T. Mars
*Attorney, Agent, or Firm*—Peter F. Casella; Donald C. Studley; William J. Crossetta, Jr.

[57] ABSTRACT

Polyhalobenzylic disulfooxonium compounds of the type

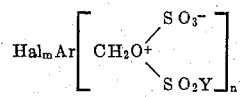

in which
- Ar is an aromatic nucleus,
- Hal is fluorine, chlorine, bromine and iodine,
- Y is fluorine, chlorine, bromine and hydroxyl,
- $n$ is 1–3, and
- $n + m$ equals 6 react with aromatic hydrocarbons under mild reaction conditions to afford high yields of aralkylated derivatives useful as pesticides.

7 Claims, No Drawings

ARALKYLATION OF AROMATIC HYDROCARBONS

RELATED APPLICATIONS

This application is a continuation-in-part of application Ser. No. 123,014, filed Mar. 10, 1971 by Victor Mark and Leon R. Zengierski.

BACKGROUND OF THE INVENTION

Polyhalobenzylhalides have been employed in the past to aralkylate aromatic hydrocarbons. For example, benzylpentachlorobenzene has been produced by reaction of pentachlorobenzyl chloride with benzene in the presence of aluminum chloride Friedel-Crafts catalyst at 60°C. to afford a 56 percent yield of the desired product. S. D. Ross et al, J.A.C.S. 71, 1949, pp. 2,756–2,758.

BRIEF DESCRIPTION OF THE INVENTION

Although sulfur trioxide is recognized as a strong oxidant, it has not been used extensively due to its random reaction pattern with hydrocarbons. With paraffins and olefins, the reaction product with sulfur trioxide is a messy, intractable, dark mixture of oxidation, condensation, polymerization, sulfonation and sulfation products, demonstrating the uncontrollability of the reaction. In contrast, as an aromatic sulfonating agent and as a sulfating agent for alcohols, sulfur trioxide is used extensively, these reactions being well developed and decumented.

It has been discovered that sulfur trioxide may be used in oxidation and insertion reactions in the absence of uncontrollable competing reactions to afford a novel class of oxonium inner salts, the disulfooxonium type inner salts, which are completely stable but highly reactive compounds.

The novel class of halogenated organic compounds are useful for the preparation of a variety of halogenated products, which in turn are useful as monomer precursors for polymer additives, especially to provide fire resistance, as pesticides and as chemical intermediates.

More particularly, the polyhalobenzylic disulfooxonium compounds can be represented by the generic formula:

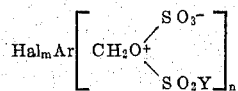

wherein:
  Ar is an aromatic nucleus
  Hal is a halogen selected from the group consisting of fluorine, chlorine, bromine and iodine;
  Y is a substitutent selected from the group consisting of fluorine, chlorine, bromine and hydroxyl;
  $m$ and $n$ are intergers so selected that their sum is the number of substitutable positions of Ar.

The aromatic nucleus Ar is intended for the purpose of this disclosure to embrace the ring structures of benzene, naphthalene, arthracene, phenanthrene and pyrene. Thus, Ar is an aromatic hydrocarbon moiety containing from 1 to 4 rings, each ring containing 6 nuclear carbon atoms in which each substitutable hydrogen on the ring has been replaced by a halogen.

This novel class of disulfooxonium compounds is obtainable, as disclosed in parent case Ser. No. 123,014 by the reaction of the appropriate halogenated aromatic compounds with reagents containing sulfur trioxide such as neat sulfur trioxide proper, sulfuric acid solutions of SO₃ (oleum), sulfur trioxide adducts, such as those with dioxane and amines and chlorosulfonic and fluoro-sulfonic acids.

The following chemical equations illustrate some of these reactions:

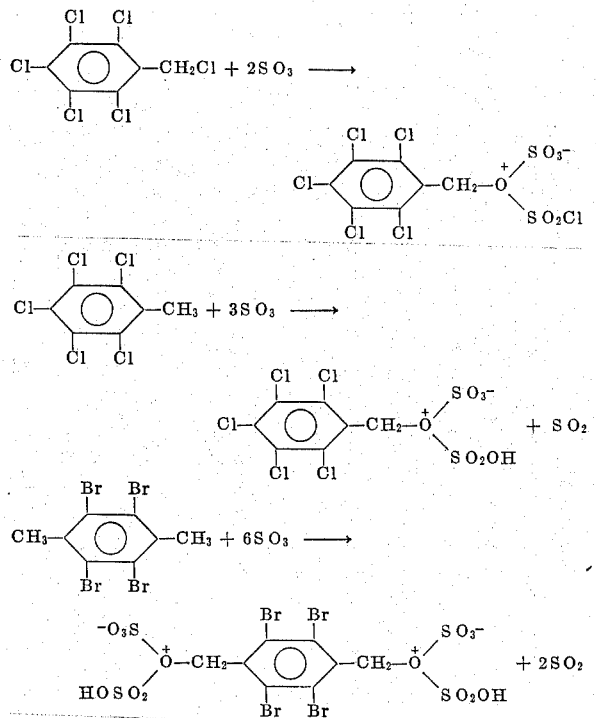

A very significant aspect of the invention is the discovery that the reaction with sulfur trioxide and sulfur trioxide containing reagents can be carried out with concomitant oxidation of the side chain of the aromatic substrates. The significance of this finding lies in the fact that even methyl groups on the aromatic nuclei can be readily and quantitatively oxidized and transformed into products represented by the generic formula supra, with Y being hydroxy in this case. In these reactions one mole of sulfur trioxide per methyl group is used up in the oxidation step proper, yielding one mole of sulfur dioxide, as illustrated by the following reactions:

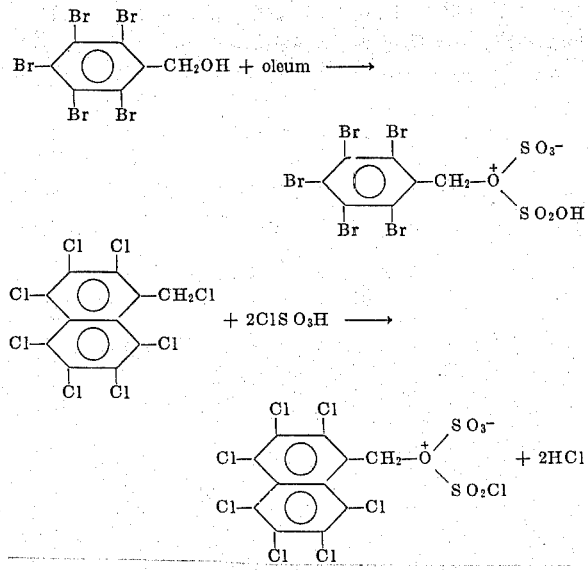

The wide scope of these reactions is indicated by the large variety of halogenated aromatic compounds which readily undergo these transformations and yield a multitude of useful products. Derivatives of all four of the common halogens are equally suitable as starting materials, if they are present in the form of mono-, di- or polynuclear aromatic compounds. The latter two classes comprise both isolated and fused ring aromatic species, some of which are listed below and in the detailed examples. All of these halogenated aromatic compounds carry one or more side chains consisting of methyl, halomethyl or hydroxymethyl substituents. As representatives of the multitude of substrates suitable for the preparation of the oxonium compounds covered by this invention the following compounds can be listed: Pentafluorotoluene, tetrafluoro-o-xylene, trifluoromesitylene, pentachlorotoluene, pentachlorobenzyl chloride, tetrachloro-m-xylene, trichloropseudocumene, α,α',2,3,5,6-hexachloro-p-xylene, pentachlorobenzyl alcohol, heptachloro-1-methylnapthalene, heptachloro-2-methylnapthalene, hexachloro-2,7-dimethyl-naphthalene, octachloro-9,10-dimethylanthracene, octachloro-4,4'-dimethylbiphenyl, pentabromotoluene, pentabromobenzyl fluoride, tetrabromo-p-xylene, 1,3,5,7-tetrabromo-2,6-dimethyl-naphthalene, tribromomesitylene, dibromodurene, pentaiodotoluene, pentaiodobenzyl fluoride, tetraiodo-o-xylene, tetraiodo-m-xylene, α,α'-dichloro-2,3,5,6-tetraiodo-p-xylene, triiodomesitylene, 2-chloro-3,4,5,6-tetrabromotoluene, 2-chloro-3,4,5,6-tetraiodotoluene, 2-chloro-3,5,6-tribromo-4-iodotoluene, 2,5-dibromo-α,α',3,6-tetrachloro-p-xylene. The reactions of many of these aromatic compounds are treated in detail in the specific examples shown later.

As a result of the wide range of reactivities of both the aromatic reactants and the sulfur trioxide containing reagents a rather wide range of the desirable reaction temperature exists. While formation of the oxonium compounds from benzylic alcohols can take place as low as −80°C, reactions involving concomitant oxidations are best carried out above 0°C., often at the boiling point of liquid SO₃, between 45° and 50°C., and with less reactive compounds, up to and in some instances about 150°C. The judicious selection of the proper SO₃ containing reagent usually obviates the use of a foreign solvent and often it is advantageous to use an excess of liquid SO₃ (which is a good solvent) or sulfuric acid (which is a liquid vehicle). A small amount (5–10 percent of concentrated sulfuric acid, when added to liquid sulfur trioxide, has often a beneficial effect in increasing the rate of the oxidation of the aromatic substrate. In a few cases where needed or where beneficial, solvents not affected or not readily attacked by the sulfur trioxide species can be employed. Most often fluorinated aliphatic halocarbons, such as trichlorofluoroethane, trichlorofluoromethane and 1,1-difluorotetrachloroethane can be employed. The reactions are carried out usually at atmospheric pressure, followed if desired by the application of vacuum to recover excess liquid sulfur trioxide. When the reaction is accompanied by an oxidation step provisions should be made for the removal of the gaseous sulfur dioxide coproduct.

The polyhalobenzylic disulfooxonium compounds thus prepared serve as reactants for the production of diarylmethane derivatives in accordance with the representative reactions:

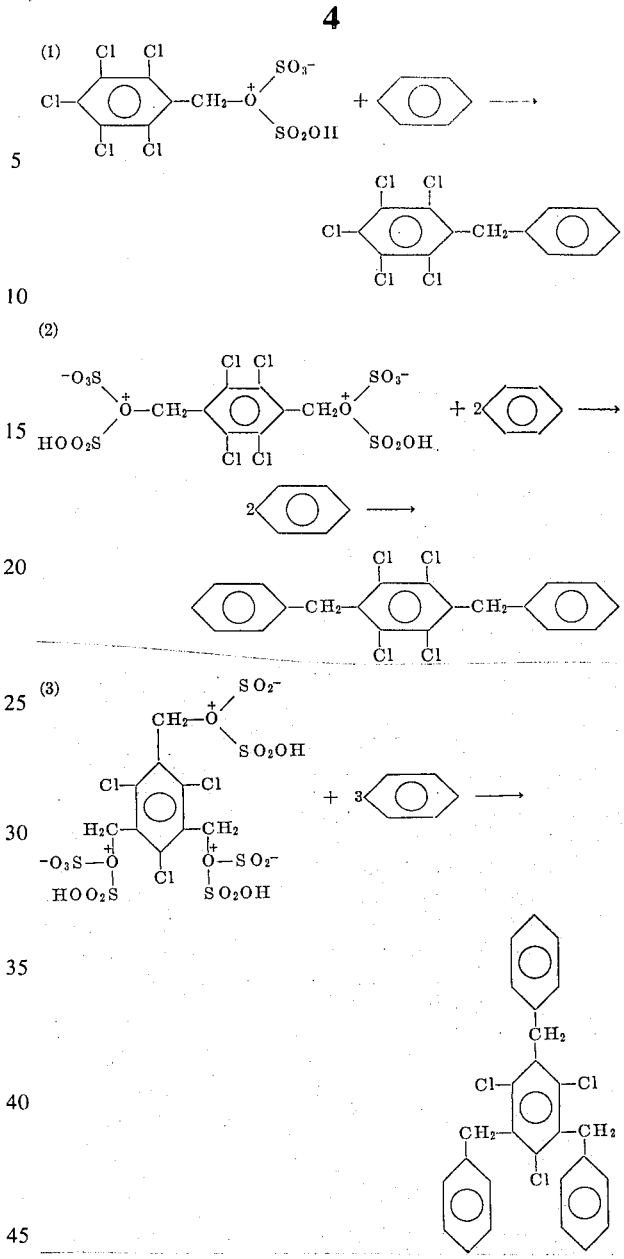

Thus, the products of the process of this invention may be described generically as Hal$_m$Ar(CH$_2$Ar')$_n$ where Hal, Ar, $m$ and $n$ are defined above. Suitable Ar' moieties include a wide range of aromatic compounds which contain at least one hydrogen available for the substitution reaction. Thus, aromatic substrates include mono-, di- and polyhalobenzenes, such as fluorobenzene, chlorobenzene, o-dichlorobenzene, p-dichlorobromobenzene, 1,2,4-trichlorobenzene, bromobenzene, p-chlorobromobenzene, iodobenzene; mono-, di- and polyalkylbenzenes, such as toluene, xylenes, mesitylene, pseudocumene, durene, ethylbenzene, isopropylbenzene, tert-butylbenzene, o-chlorotoluene, dodecylbenzene; isolated and fused di- and polycyclic aromatic compounds, such as biphenyl, naphthalene, anthracene, phenanthrene, pyrene, 1-chloronaphthalene, 9,10-dichloroanthracene, triphenylmethane, indene and indane.

These raction, characterized by high conversion and purity of the products, take place in analogous fashion with various mono-, di-, and tri-oxonium compounds as well as other halogenated aromatic compounds and are eminently suitable for preparative (manufacturing) processes. The variety of mono-, di- and polyfunctional end products of these reactions find uses as additives to polymers which they render fire resistant by virtue of their high halogen content, as monomers for the preparation of a variety of polymeric systems, as chemical intermediates and as pesticides.

Thus, the process of the instant invention produces compounds of special interest of the type $Hal_mAr(CH_2Ar')_n$ in which Ar is a mono- or polynuclear aromatic hydrocarbon moiety of 1 to 4 six carbon rings;

Ar' is a mono- or polynuclear aromatic hydrocarbon moiety of 1 to 4 six carbon rings in which from 0 to 3 ring substituents are selected from the group consisting of —Cl, —F, —Br, and —I and alkyl of 1 to 12 carbon atoms;

Hal is selected from the group consisting of —Cl, —Br, —F and —I;

n is a number 1, 2 or 3; with the proviso, that when n is 1, one of Ar and Ar' is polynuclear or Ar' is phenyl containing from 1 to 3 ring substituents selected from the group consisting of —Cl, —F, —Br, —I, and alkyl of 1 to 12 carbon atoms;

m and n together equal all substitutable positions of Ar.

More specifically, the compounds of this invention are of the formula:

$Hal_mAr(CH_2Ar')_n$ in which

Ar is an aromatic moiety selected from the group consisting of the benzene, naphthalene, anthracene, phenanthrene and pyrene hydrocarbons;

Ar' is an aromatic moiety selected from the mononuclear members benzene, indane and indene and the polynuclear members biphenyl, triphenylmethane, naphthalene, anthracene, phenanthrene and pyrene hydrocarbons;

Hal is selected from the group consisting of —Cl, —Br, —F and I;

n is one of the numbers 1, 2 and 3 providing that when Hal is Cl, Ar is other than the benzene nucleus.

The compounds of the formula $Hal_mAr(CH_2Ar')_n$ may be produced by merely contacting one of the disulfooxonium compounds disclosed in parent application Ser. No. 123,014 with an aromatic compound containing a substitutable nuclear hydrogen atom of the formula HAr' at a temperature between about −50° and about 160°C. At temperature within the range of ambient temperature to about 100°C., the reaction of the disulfooxonium salts with aromatic compounds containing substitutable hydrogen is spontaneous with a concomitant reaction exotherm. Thus, cooling may be employed to avoid the production of excessively high reaction temperatures. Generally, it is preferred to employ an inert diluent as the reaction medium. Where the aromatic reactant HAr' is liquid, it is most preferred to employ an excess of that reactant as the inert diluent. However, when the organic reactant HAr' is not a liquid, other inert diluents may be employed, generally the preferred diluents are the fluorinated aliphatic halocarbons such as trifluorochloromethane, trichlorofluoroethane, 1,1 difluorotetrachloroethane, and the halocarbons such as dichloromethane and chloroform.

At the completion of the reaction of the disulfooxonium salt with an aromatic reactant, water is added to the reaction product to isolate a water insoluble reaction product. In order to remove any excess aromatic reactant or liquid diluent, the water insoluble reaction product of this invention may be steam stripped. Actually, a steam-stripping operation may serve to simultaneously remove excess aromatic reactant or diluent while providing water to separate the water insoluble reaction product and hydrolize any excess disulfooxonium salt present in the product, to form sulfuric acid which is readily removed from the water insoluble product by known methods.

The products of the aralkylation process of the instant invention always contain the $Hal_mArCH_2$ — functional group of the parent disulfooxonium reactant as a nuclear substituent of the Ar' aromatic nucleus. Thus, the products of this invention present valuable additives for polymers to impart fire resistance to the resulting polymer as well as chemical intermediates for the production of various other compounds as well as pesticidal derivatives. Due to the high halogen content of the aralkylated derivatives of this invention, the flame or fire retardant activity may be, by the appropriate selection of a reactant HAr', tailored for use with a specific polymer or resin.

The following examples are given for purposes of illustration of this invention and are not to be construed as limiting it except as set forth in the claims. Examples 1–16 present representative preparative procedures for illustrative disulfooxonium reactants for use in the process of this invention. Examples 17–21 illustrate the facile alkylation reaction of this invention.

EXAMPLE 1

Preparation of 2,3,4,5,6-pentachlorobenzyldisulfooxonium hydroxide inner salt from pentachlorotoluene and sulfur trioxide

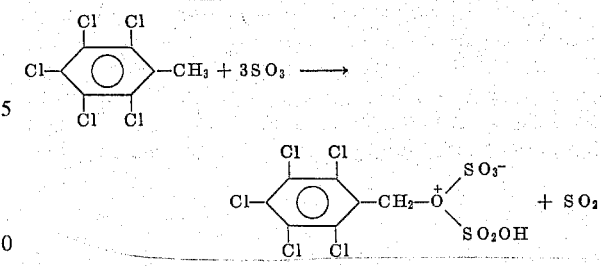

Liquid sulfur trioxide, (200 ml, 385 g) was added to 26.4 g. (0.1 mole) of pure 2,3,4,5,6-pentachlorotoluene (mp 224°–225°C) placed in a 500 ml 3-neck tared flask provided with stirrer, thermometer and reflux condenser the end of which was attached to a bubble counter so that the rate of gas evolution during the reaction can be visually estimated. External heat was applied to the flask to bring the sulfur trioxide to reflux. Soon a light blue color developed, which turned gradually deeper to a vivid royal blue. The color change was accompanied by gas evolution which was identified as sulfur dioxide. The steady gas evolution, which began after 10 minutes of reflux, lasted for 2–3 hours, after which it became gradually slower and the reaction mixture gradually acquired a dark green-grey color. The weight of the reaction mixture at this time indicated a loss of 6.9 g, as compared to the theoretical loss of 6.4 g, corresponding to one mole of sulfur dioxide evolved. The excess of sulfur trioxide, which acted also as a solvent during the reaction was distilled off first at atmospheric pressure, then under aspirator vacuum at a temperature not exceeding 70°C. The weight (45.2 g) of the product, a greenish-grey solid, indicated the $C_7H_3Cl_5O_7S_2$ composition and this was confirmed by its hydrolysis which yielded 0.2 moles of sulfuric acid and 0.1 mole of pentachlorobenzyl alcohol, identified by elemental analysis, infrared spectroscopy, melting point and nuclear magnetic resonance spectroscopy (see Example 23). The evolvement of the reaction was also followed by nuclear magnetic resonance (nmr) spectroscopy which indicated that even in the early stages of the reaction the characteristic proton resonance of pentachlorotoluene at 2.52 ppm downfield from tetramethylsilane (TMS) completely disappeared. Instead, a new peak at 4.55 ppm appeared, which is assignable to the radical cation formed from pentachlorotoluene by the loss of one electron. During the refluxing ans sulfur dioxide evolution period two additional peaks developed in increasing intensities and in approximately in a 2:1 ratio at 6.29 and 9.21–9.60 ppm (the latter is somewhat variable during the reaction). The former corresponds to the two benzylic hydrogens adjacent to the oxonium moiety and the latter corresponds to the acidic proton of the sulfuric acid moiety. The intensity of the peak corresponding to the radical cation, which accounts for the intense blue color, diminishes to a few percent after 2 hours of reflux and the intensities of the protons of the oxonium compound become constant after this period.

EXAMPLE 2

Preparation of pentachlorobenzyldisulfooxonium hydroxide inner salt from pentachlorobenzyl alcohol and sulfur trioxide

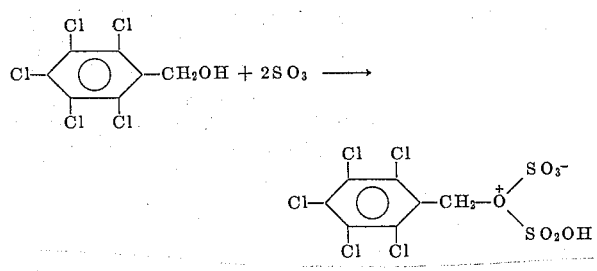

The procedure of Example 1 was repeated, except that the equivalent amount (28.0 g) of pentachlorobenzyl alcohol, mp 195°–196°C. was substituted for pentachlorotoluene. In contrast to the former case only a transient blue color appeared which on reflux turned greyish green, but there was no gas evolution. The identity of the product with that of the former example was established by nuclear magnetic resonance, which showed the two peaks of the oxonium compound.

EXAMPLE 3

Preparation of pentachlorobenzyl(chlorosulfonyl)sulfooxonium hydroxide inner salt from pentachlorobenzyl chloride and sulfur trioxide

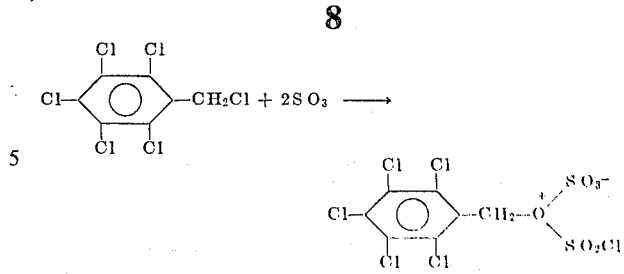

The procedure of Example 1 was repeated, except that the equivalent amount (29.9 g) of pentachlorobenzyl chloride, mp 100°–101°C, was substituted for pentachlorotoluene. A 10 minute refluxing period sufficed to convert the halide into the halooxonium compound, without gas evolution and without the occurrence of a highly colored solution. The chemical shift of this oxonium compound was at 6.35 ppm in $SO_3$ solution.

EXAMPLE 4

Preparation of the sulfooxonium compounds from pentabromotoluene and sulfur trioxide

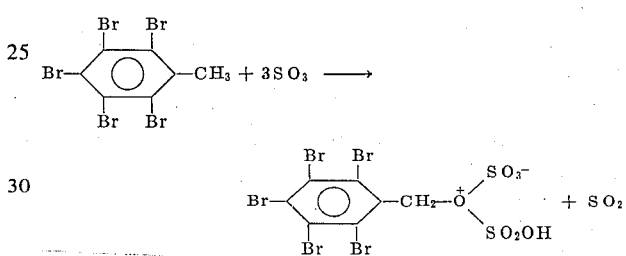

When the procedure of Example 1 was repeated with the substitution of 48.7 g 2,3,4,5,6-pentabromotoluene (mp 284°–286°C.) for pentachlorotoluene, gas evolution and the development of a dark green color accompanied the formation of the oxonium compound which was obtained in quantitative yield.

EXAMPLE 5

Preparation of the monooxonium compound from pentafluorotoluene and sulfur trioxide

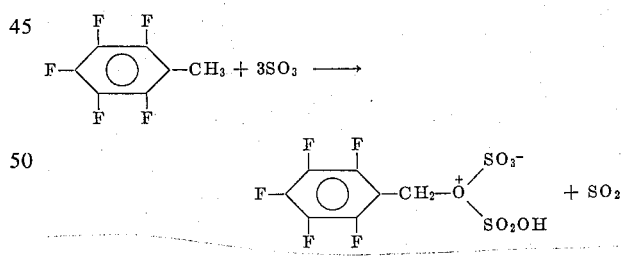

The procedure of Example 1 was repeated except that 18.2 g of 2,3,4,5,6-pentafluorotoluene bp 117°–118°C, $n_D^{20}$ 1.4023, was substituted for pentachlorotoluene and that the refluxing period was extended to 6 hours. The originally colorless solution after 3 hours turned deep red and the methyl protons at 2.44 ppm disappeared, giving rise to the methylene protons at 6.05 ppm and the acid proton at 9.58 ppm.

EXAMPLE 6

Preparation of 2,3,4,5-tetrachloro(p-phenylenedimethylene)-bis(disulfooxonium dihydroxide)bis(inner salt) from 2,3,5,6-tetrachloro-p-xylene and sulfur trioxide

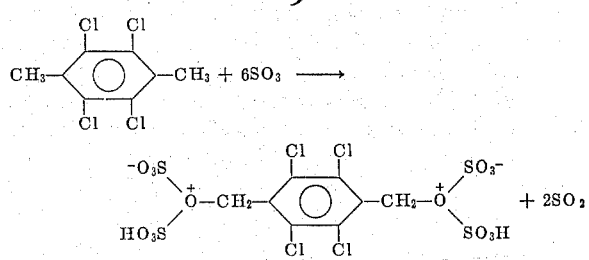

The procedure of Example 1 was repeated, except that 24.4 g of 2,3,5,6-tetrachloro-p-xylene, mp. 218°–219°C. was substituted for pentachlorotoluene. The oxidation step of the xylene was apparently faster than that of the toluene as judged by the vigor of the sulfur dioxide evolution on refluxing the purple solution of the radical cation. After a refluxing period of 0.5 hour only 5 percent radical cation was left in solution, which contained 95 percent of the dioxonium compound, characterized by the proton nuclear magnetic resonance peaks at 6.36 and 9.73 ppm in the correct 2:1 ratio. Distillation of the excess of sulfur trioxide resulted in a 93 percent efficiency in its recovery and the isolation of the dioxonium compound in 93 percent yield. In addition to the nuclear magnetic resonance data given above the new product was characterized also by the quantitative analysis of its hydrolysis products, which included four mole equivalents of sulfuric acid and one mole equivalent of tetrachloro-p-xylene diol.

EXAMPLE 7

Preparation of the dioxonium compound from 2,4,5,6-tetrachloro-m-xylene and sulfur trioxide

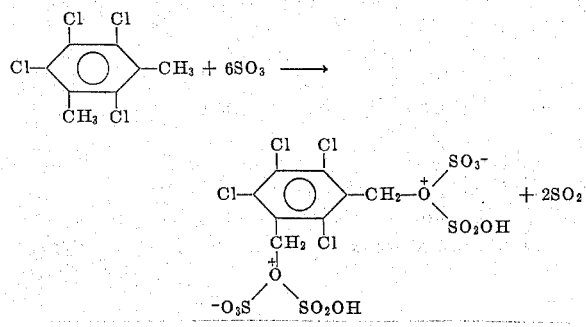

The procedure of Example 6 was repeated, except that 2,4,5,6-tetrachloro-m-xylene, mp. 220°–222°C., was substituted for the para isomer. The oxidation of the chlorocarbon occurred readily and was essentially complete after one hour of refluxing period, when the nuclear magnetic resonance of the purple solution indicated the absence of any starting material, the presence of only 2.5 percent of the radical cation (chemical shift at 4.68 ppm downfield from the references tetramethylsilane and the presence of the dioxonium compound in 97.5 percent abundance, as indicated by the chemical shifts at 6.40 and 9.83 ppm in the correct 2:1 ratio. Further identification of the novel compound was done by elemental and spectral analysis of its hydrolysis products, which included, after the stripping of the excess of sulfur trioxide, four moles of sulfuric acid and the formation of one mole equivalent of tetrachloro-m-xylene diol.

EXAMPLE 8

Preparation of the dioxonium compounds from 3,4,5,6-tetrachloro-o-xylene and sulfur trioxide

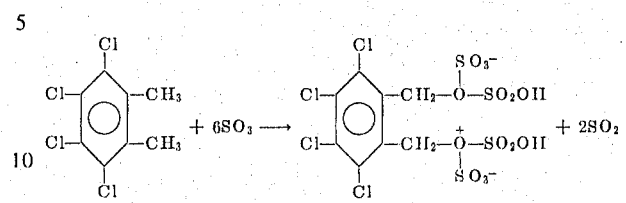

The procedure of Example 6 was repeated except that 3,4,5,6-tetrachloro-o-xylene, mp. 226°–228.5°C., was substituted for the para isomer. The formation of the radical cation and of the dioxonium compound occurred readily as evidenced by the immediate development of a deep purple solution and the copious evolution of sulfur dioxide on heating. Identification of the dioxonium compound was done as in the previous examples, except that on hydrolysis only three equivalent moles of sulfuric acid were produced, in addition to one mole equivalent of the cyclic sulfate of tetrachloro-o-xylenediol (see Example 31). The presence of the dioxonium compound, as shown in the title structure, was diagnosed directly be proton nuclear magnetic resonance, which identified the benzylic protons by a singlet at 6.32 ppm and the acidic protons at 9.99 ppm in the correct 2:1 ratio.

EXAMPLE 9

Preparation of the dioxonium compounds from 2,3,5,6-tetrabromo-p-xylene and sulfur trioxide

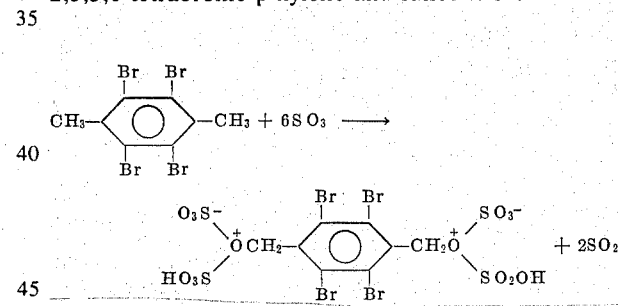

The procedure of Example 6 was repeated except that 42.2 g of 2,3,5,6-tetrabromo-p-xylene, mp 251°–252.8°C., was substituted for the corresponding tetrachloro compound. The oxidiation of the chlorocarbon occurred readily as evidenced by the formation of a deep blue-green slurry, indicative of the radical species, and by the evolution of sulfur dioxide. Proton nuclear magnetic resonance of the sulfur trioxide solution showed even only after one hour of reaction time, the absence of starting material (by the absence of the methyl protons at 2.79 ppm) and the presence in 98 percent of the dioxonium compound by the presence of the benzylic protons at 6.66 ppm and of the acidic protons at 9.96 ppm, in the correct 2:1 ratio, and the presence of only 2 percent of the radical species by a peak at 4.74 ppm. Hydrolysis of the highly reactive dioxonium compound, a dark, solid product yielded four mole equivalents of sulfuric acid, as evidenced by titration, and one mole equivalent of 2,3,5,6-tetrabromo-p-xylene-1,4-diol.

EXAMPLE 10

Preparation of the dioxonium compound from 2,4,5,6-tetrabromo-m-xylene and sulfur trioxide

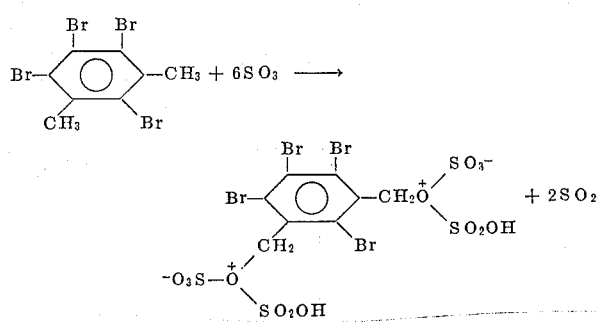

The procedure of Example 9 when applied to 2,4,5,6-tetrabromo-m-xylene, mp 251°–252°C., yielded the corresponding dioxonium compound, as evidenced by its isolation as a reactive solid material in quantitative yield as well as by its hydrolysis, again in quantitative yield, to four mole equivalents of sulfuric acid and one mole equivalent of 2,4,5,6-tetrabromo-m-xylene-1,3-diol.

EXAMPLE 11

Preparation of the dioxonium compound from 2,3,5,6-tetraiodo-p-xylene and sulfur trioxide

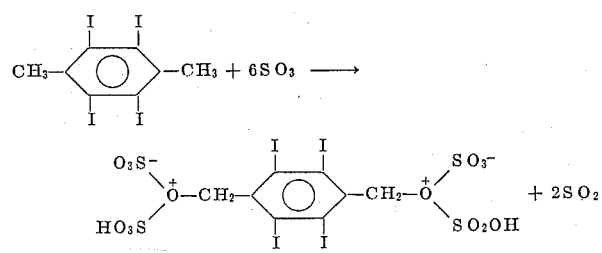

Repeating the procedure of Example 6 with 61.0 g of 2,3,5,6-tetraiodo-p-xylene, mp 245°–247°C., in place of the tetrachloro analog resulted in the facile oxidation of the iodocarbon and the formation of the dioxonium compound in quantitative yield.

EXAMPLE 12

Preparation of the dioxonium compound from 1,3,5,7-tetrabromo-2,6-dimethylnaphthalene and sulfur trioxide

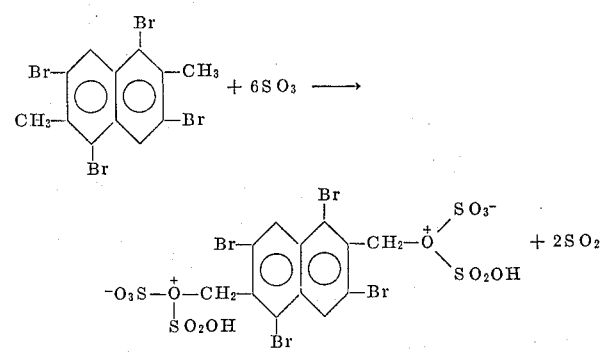

When the procedure described in Example 9 was repeated with the replacement of the tetrabromoxylene with 47.2 g of 1,3,5,7-tetrabromo-2,6-dimethylnaphthalene, mp 226°–229°C., the formation of the dioxonium compound occurred readily in the fashion described in the previous examples.

EXAMPLE 13

Preparation of 2,4,6-tribromo s-phenyltris(methylene)-tris [disulfooxonium] trihydroxide tris(inner salt) from 2,4,6-tribromomesitylene and sulfur trioxide

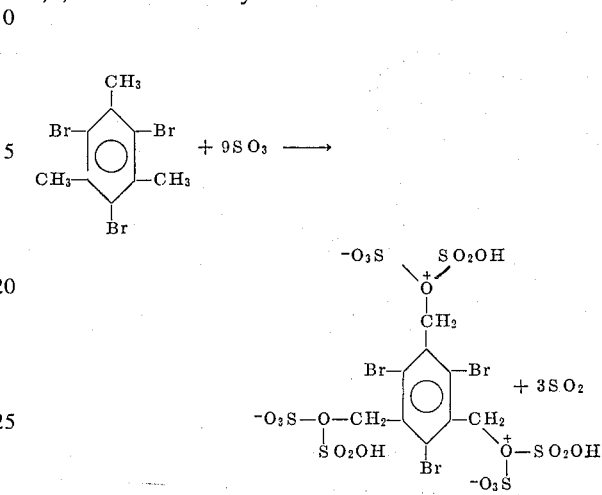

The procedure described in Example 9 was repeated, except that the tetrabromo-p-xylene was replaced with 35.7 g of 2,4,6-tribromomesitylene, mp 215°–217°C. A very facile oxidation of the bromocarbon occurred with copious evolution of sulfur dioxides, resulting in the formation of the trioxonium compound in quantitative yield.

EXAMPLE 14

Preparation of the dioxonium compound from 2,3,5,6-tetrachloro-p-xylene-1,4-diol and sulfur trioxide

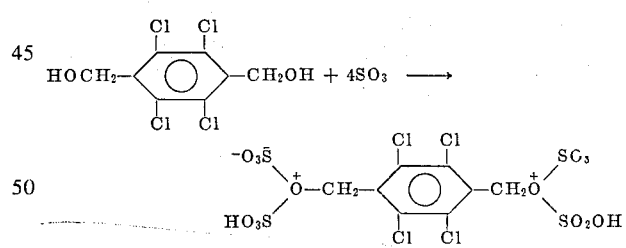

The dissolution of 27.6 g of 2,3,5,6-tetrachloro-p-xylene-1,4-diol in 100 ml (197 g) of liquid sulfur trioxide took place without the evolution of sulfur dioxide, which did not commence even after 3 hours of refluxing. Stripping of the excess of sulfur trioxide resulted in the isolation of the dioxonium compound identical with the one obtained in Example 6.

EXAMPLE 15

Preparation of 2,3,5,6-tetrachloro (p-phenylenedimethylene) bis (chlorosulfonyl)sulfooxonium dihydroxide bis(inner salt) from α,α',2,3,5,6-hexachloro-p-xylene and sulfur trioxide

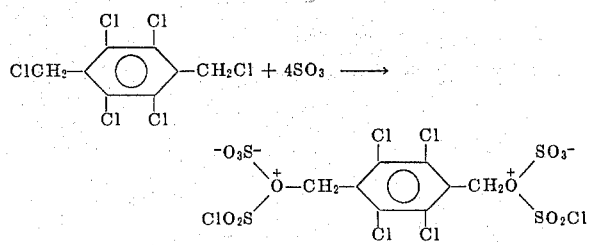

The procedure of Example 3 was repeated except that 31.3 g of α, α',2,3,5,6-hexachloro-p-xylene, mp 179°–181°C, was substituted for pentachlorobenzyl chloride. Although a deep purple solution was formed, no evolution of sulfur dioxide occurred. The deep purple component of the reaction mixture was identified as the benzylic radical by its nuclear magnetic resonance peak at 4.69 ppm whereas the dioxonium compound was also identified by its chemical shift at 6.41 ppm, as well as by its hydrolysis in quantitative yield to four equivalent moles of sulfuric acid, two equivalent moles of hydrochloric acid and one equivalent mole of 2,3,5,6-tetrachloro-p-xylene-1,4-diol.

EXAMPLE 16

Preparation of the dioxonium compound from α,α',3,4,5,6-hexachloro-o-xylene and sulfur trioxide

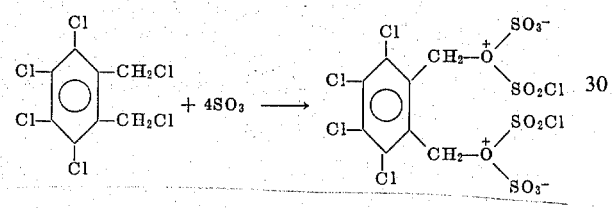

The procedure of Example 3, when applied to 31.3 g of α,α',3,4,5,6-hexachloro-o-xylene, mp 92°–92.5°C, yielded an intensely purple solution but essentially no sulfur dioxide evolution even during a refluxing period of 3 hours. The intermediate biradical was identified by its nuclear magnetic resonance peak at 4.65 ppm (present in about 8–10 percent abundance in the reaction mixture), whereas the dioxonium compound (90–92 percent of the reaction mixture) had the chemical shift of its protons at 6.31–6.33 ppm. After the stripping of the excess of sulfur trioxide, the dioxonium compound was obtained as a dark amber colored viscous oil in quantitative yield (63.5 g) and was further identified by its hydrolysis to three mole equivalents of sulfuric acid, two mole equivalents of hydrochloric acid and one mole equivalent of the cyclic sulfate of 3,4,5,6-tetrachloro-o-xylene-1,2-diol.

EXAMPLE 17

Preparation of 2,3,4,5,6-pentachlorodiphenylmethane

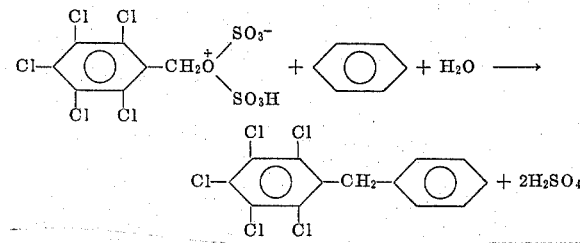

The addition of the oxonium compound prepared in Example 1 to an excess (200 ml) of benzene, with cooling and stirring, followed by the addition of water, separation of the two layers and stripping of the excess of benzene resulted in the isolation of a light brown solid, 28.8 g, which, after recrystallization from ethanol and hexane, yielded white needles, mp 112.5°–113.5°C. Elemental analysis, infrared and nuclear magnetic resonance indicated that the product of this reaction is the pentachlorodiphenylmethane indicated in the title. The yield, accordingly, was 83 percent. The infrared maxima occurred at 3075, 3052, 3022, 2928, 2840, 1601, 1542, 1495, 1450, 1438, 1360, 1352, 1337, 1310, 1282, 1230, 1180, 1118, 1112, 1072, 1038, 946 884, 776, 726, 692, 678, 638, 618, 602, 540, 522 and 448 cm$^{-1}$ in $C_2Cl_4$ and $CS_2$ solution. The methylene protons in the nuclear magnetic resonance scan in $CDCl_3$ solution were at 4.37 ppm as a singlet and the aromatic protons at 7.18 ppm as multiplets in the correct 2.5 area ratio.

Calculated for $C_{13}H_7Cl_5$: C, 45.85; H, 2.07; Cl, 52.07%.

Found: C, 45.9; H, 2.1; Cl, 51.1%.

EXAMPLE 18

Preparation of 2,3,5,6-tetrachloro-α,α'-diphenyl-p-xylene

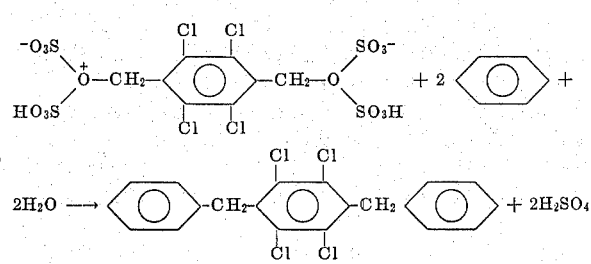

When the dioxonium compound prepared in Example 6 was added portionwise and with cooling to an excess (200 ml) of benzene and the reaction mixture was worked up as in the preceding example, there was obtained 21.6 g of a yellow solid, which after recrystallization from carbon tetrachloride, had an mp 179.5°–181.0°C. Infrared, nuclear magnetic resonance and elemental analysis confirmed its structure as that indicated in the title of this example. The infrared parameters, run in $C_2Cl_4$ and $CS_2$ solutions, were at 3075, 3052, 3022, 2922, 2835, 1600, 1498, 1452, 1430, 1390, 1370, 1282, 1250, 1158, 1133, 1100, 1072, 1029, 932, 883, 729, 693, 654, 618, 580, 524, 500 and 447 cm$^{-1}$. The benzylic hydrogens were found to resonate in $CDCl_3$ solution at 4.41 ppm and the aromatic protons at 7.20 ppm (as multiplets) in the correct 2:5 area ratio.

Calculated for $C_{20}H_{14}$, $Cl_4$: C, 60.60; H, 3.53; Cl, 35.87%.

Found: C, 60.7; H, 3.6; Cl, 35.7%.

EXAMPLE 19

Preparation of α-(2,3,4,5,6-pentabromophenyl) xylene

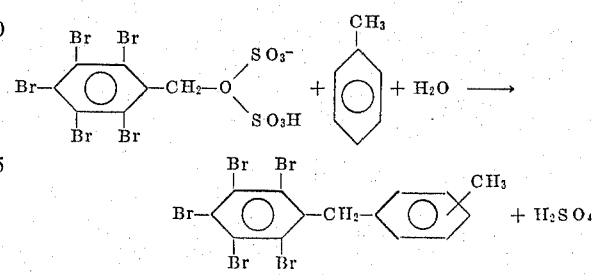

The addition of the oxonium compound prepared in Example 4 to an excess of toluene, with cooling, and stirring, followed by the addition of water, separation of the two layers produced and steam stripping of the excess toluene, yields the desired product.

EXAMPLE 20

Preparation of 2,3,5,6-tetrabromo-α,α' di(2-p-xylyl)-p-xylene

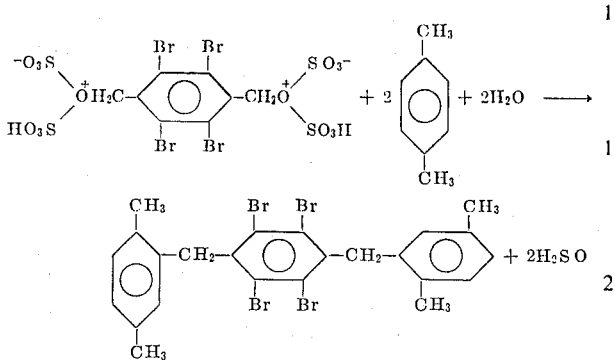

Addition of the dioxonium compound of Example 9 portionwise with cooling to a stoichiometric excess of xylene affords, after workup as presented in the preceding example, the title compound.

EXAMPLE 21

Preparation of α-(biphenylyl)-2,3,4,5,6-pentachlorotoluene

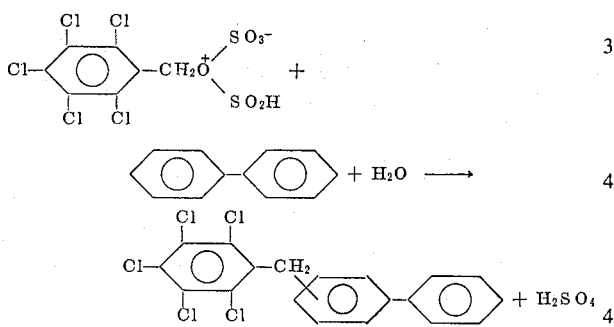

The product of Example 3 is reacted with a stoichiometric excess of biphenyl with cooling and stirring in 1,2-dichloroethane slurry. After the reaction had gone to completion, water was added to the reaction mixture to remove sulfuric acid. The two layers are separated and the excess biphenyl was removed from the inorganic layer to yield the desired product as a mixture of isomers.

What is claimed is:

1. A process for the production of a compound of the formula:

$$Hal_mAr(CH_2Ar')_n$$

wherein

Ar is an aromatic moiety selected from the group consisting of the benzene, naphthalene, anthracene, phenanthrene and pyrene hydrocarbons;

Ar' is an aromatic moiety selected from mononuclear benzene indane, indene, and poly-nuclear biphenyl triphenylmethane, naphthalene, anthracene, phenanthrene and pyrene hydrocarbons;

Hal is selected from the group consisting of —Cl, —Br, —F, and —I, providing that when Hal is —Cl, Ar is other than the benzene nucleus;

n is a number 1, 2 or 3; with the proviso, that when n is 1, one of Ar and Ar' is polynuclear or Ar' is phenyl containing from 1 to 3 ring substituents selected from the group consisting of —Cl, —F, —Br, —I and alkyl of 1 to 12 carbon atoms; $m$ and $n$ together equal all substitutable positions of Ar which comprises introducing a compound of the formula

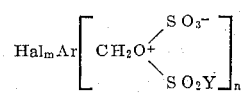

wherein Hal, $m$, Ar, and $n$ are as before described and Y is fluorine, chlorine, bromine and hydroxy, into intimate contact with HAr' where H is a substitutable nuclear hydrogen atom of Ar' at a temperature from about −50° to about 160°C.

2. The process of claim 1 in which the reaction mixture produces a spontaneous exotherm at from ambient temperature to about 100°C.

3. The process of claim 2 in which the reaction product is treated with water after the completion of the reaction exotherm, to isolate a water insoluble product.

4. The process of claim 2 in which the reaction product is steam stripped to remove any HAr' excess present.

5. The process of claim 1 in which the reaction is conducted in the presence of a liquid diluent.

6. The process of claim 5 in which the liquid diluent is provided by an excess of HAr'.

7. The process of claim 5 in which said diluent is at least one aliphatic halocarbon of the group consisting of $F_3CCl$, $CH_2Cl_2$, $Cl_3C-CFH_2$, $F_2CCl\ CCl_3$.

* * * * *

PO-1050
(5/69)

UNITED STATES PATENT OFFICE
CERTIFICATE OF CORRECTION

Patent No. 3,821,320  Dated June 28, 1974

Inventor(s) Victor Mark and Leon R. Zengierski

It is certified that error appears in the above-identified patent and that said Letters Patent are hereby corrected as shown below:

Column 1, line 30, "decumented" should read --documented--.
Column 2, lines 15-32 should be substituted for Column 2, lines 46-66.
Column 2, lines 46-66 should be substituted for Column 2, lines 15-32.
Column 4, line 17, delete; line 66, "reaction" should read --reactions--.
Column 7, line 21, "ans" should read --and--. Column 10, line 27, "be" should read --by--; line 51, "oxidiation" should read --oxidation--.
Column 15, line 19, that part of the formula reading "$2H_2SO$" should read --$2H_2SO_4$--;line 37, that part of the formula reading

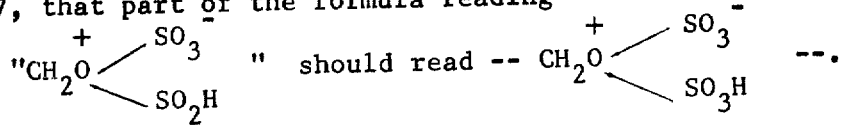

Column 16, Claim 1, line 10, "benzene indane" should read --benzene, indane--.

Signed and sealed this 5th day of November 1974.

(SEAL)
Attest:

McCOY M. GIBSON JR.
Attesting Officer

C. MARSHALL DANN
Commissioner of Patents